(12) United States Patent
Lee et al.

(10) Patent No.: US 11,129,181 B2
(45) Date of Patent: Sep. 21, 2021

(54) METHOD FOR TRANSMITTING UPLINK CONTROL INFORMATION OF TERMINAL IN WIRELESS COMMUNICATION SYSTEM AND DEVICE USING THE METHOD

(71) Applicant: LG ELECTRONICS INC., Seoul (KR)

(72) Inventors: Seungmin Lee, Seoul (KR); Suckchel Yang, Seoul (KR); Daesung Hwang, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 537 days.

(21) Appl. No.: 15/752,232

(22) PCT Filed: Aug. 16, 2016

(86) PCT No.: PCT/KR2016/008978
§ 371 (c)(1),
(2) Date: Feb. 12, 2018

(87) PCT Pub. No.: WO2017/026871
PCT Pub. Date: Feb. 16, 2017

(65) Prior Publication Data
US 2020/0214024 A1 Jul. 2, 2020

Related U.S. Application Data

(60) Provisional application No. 62/204,953, filed on Aug. 13, 2015.

(51) Int. Cl.
*H04W 72/12* (2009.01)
*H04B 7/0456* (2017.01)
(Continued)

(52) U.S. Cl.
CPC ...... *H04W 72/1268* (2013.01); *H04B 7/0486* (2013.01); *H04B 7/0626* (2013.01);
(Continued)

(58) Field of Classification Search
CPC .......... H04W 72/1268; H04W 72/0413; H04B 7/0639; H04B 7/0632; H04B 7/0626; H04B 7/0486; H04L 5/0055
See application file for complete search history.

(56) References Cited

U.S. PATENT DOCUMENTS

2011/0243012 A1* 10/2011 Luo ........................ H04L 5/0064
370/252
2011/0299484 A1 12/2011 Nam et al.
(Continued)

OTHER PUBLICATIONS

PCT International Application No. PCT/KR2016/008978, Written Opinion of the International Searching Authority dated Nov. 14, 2016, 4 pages.
(Continued)

*Primary Examiner* — Harry H Kim
(74) *Attorney, Agent, or Firm* — Lee, Hong, Degerman, Kang & Waimey

(57) ABSTRACT

Provided are a method for transmitting uplink control information of a terminal in a wireless communication system and a terminal device using the method. The method comprises: determining the number of transmission blocks to be transmitted via a PUSCH supporting multiple-layer transmission; according to the determined number of transmission blocks, determining UCI to be included in each transmission block; and transmitting each transmission block comprising the UCI to a base station.

4 Claims, 14 Drawing Sheets

(51) Int. Cl.
*H04B 7/06* (2006.01)
*H04L 5/00* (2006.01)
*H04W 72/04* (2009.01)
*H04L 1/06* (2006.01)

(52) U.S. Cl.
CPC ......... *H04B 7/0632* (2013.01); *H04B 7/0639* (2013.01); *H04L 5/0055* (2013.01); *H04W 72/0413* (2013.01)

(56) References Cited

U.S. PATENT DOCUMENTS

| | | | |
|---|---|---|---|
| 2013/0028209 A1* | 1/2013 | Kishiyama ........ | H04W 72/0413 370/329 |
| 2013/0051369 A1* | 2/2013 | Ko ........................ | H04W 72/06 370/335 |
| 2013/0077523 A1* | 3/2013 | Ko ........................ | H04L 1/0031 370/252 |
| 2014/0086174 A1 | 3/2014 | Nam et al. | |
| 2018/0020430 A1* | 1/2018 | Aiba ..................... | H04L 5/0057 |
| 2018/0199314 A1* | 7/2018 | Takeda ................ | H04W 72/044 |

OTHER PUBLICATIONS

Catt, "UCI feedback on PUSCH for up to 32 CCs," 3GPP TSG-RAN WG1 #81, R1-152570, May 2015, 4 pages.
LG Electronics, "Enhancements to UCI on PUSCH for Rel-13 CA," 3GPP TSG-RAN WG1 #81, R1-152719, May 2015, 6 pages.

* cited by examiner

METHOD FOR TRANSMITTING UPLINK CONTROL INFORMATION OF TERMINAL IN WIRELESS COMMUNICATION SYSTEM AND DEVICE USING THE METHOD

CROSS-REFERENCE TO RELATED APPLICATIONS

This application is the National Stage filing under 35 U.S.C. 371 of International Application No. PCT/KR2016/008978, filed on Aug. 16, 2016, which claims the benefit of U.S. Provisional Application No. 62/204,953, filed on Aug. 13, 2015, the contents of which are all hereby incorporated by reference herein in its entirety.

BACKGROUND OF THE INVENTION

Field of the invention

The present invention relates to wireless communication, and more particularly, to a method for transmitting uplink control information by a user equipment in a wireless communication system and a user equipment for performing such a method.

Related Art

International Telecommunication Union Radio (ITU-R) communication sector is proceeding with standardization of an International mobile telecommunication (IMT)-Advanced, a next-generation mobile communication system following the $3^{rd}$-generation. The IMT-Advanced aims at supporting Internet protocol (IP)-based multimedia services at a data rate of 1 Gbps in a stationary and low-speed movement state and at a data rate of 100 Mbps in a high speed movement state.

3rd-generation partnership project (3GPP), a system standard that meets the requirements of the IMT-Advanced, provides long term evolution (LTE)-Advanced by improving the LTE which is based on an orthogonal frequency division multiple access (OFDMA)/single carrier-frequency division multiple access (SC-FDMA) transmission scheme. The LTE-advanced is one of potential candidates for the IMT-Advanced.

In the existing LTE-A, a maximum of five carriers (cells) are aggregated to provide carrier aggregation (CA), but, in a future wireless communication system, enhanced CA (eCA) of aggregating a maximum of 32 carriers (cells) is considered. eCA may be referred to as massive CA.

In such an eCA scenario, the amount of uplink control information, for example, channel state information (CSI) or acknowledgment/not-acknowledgment (ACK/NACK) that the user equipment must transmit may increase.

Thus, a method and a user equipment capable of efficiently reporting the increased uplink control information are needed.

SUMMARY OF THE INVENTION

The present invention is to provide a method for transmitting uplink control information by a user equipment in a wireless communication system and a user equipment for performing such a method.

In one aspect, provided is a method for transmitting uplink control information (UCI) by a user equipment (UE) in a wireless communication system. The method includes determining a number of transport blocks (TBs) to transmit using a physical uplink shared channel (PUSCH) supporting multiple-layers transmission, determining corresponding UCI to be included in each transport block based on the determined number of transport blocks and transmitting each transport block including the corresponding UCI to a base station.

When one transport block is to be transmitted using two layers of the PUSCH, the UE may duplicate UCI to be transmitted to form duplicated UCI, map the UCI to be transmitted to a first layer of the two layers, map the duplicated UCI to a second layer of the two layer and transmit the mapped UCIs using the layers.

The UCI to be transmitted may include at least one of ACK/NACK (acknowledgment/not-acknowledgment) information and channel state information.

The channel state information may include at least one of a rank indicator (RI), a channel quality indicator (CQI), and a precoding matrix index (PMI).

When two transport blocks are to be transmitted using the PUSCH, at least one of acknowledgment/not-acknowledgment (ACK/NACK) information and a rank indicator (RI) may be included in a first transport block of the two transport blocks. At least one of a channel quality indicator (CQI) and a precoding matrix index (PMI) may be included in a second transport block of the two transport blocks.

The second transport block may be modulated with a higher modulation order than the first transport block.

Only the UCI may be transmitted on the PUSCH without data transmission thereon.

The UE may receive a downlink control information (DCI) format from the base station by the user equipment and only when the DCI format is a specific DCI format, only the UCI may be transmitted on the PUSCH without data transmission thereon.

Only when a number of cells configured for the user equipment is greater than a threshold value, only the UCI may be transmitted on the PUSCH without data transmission thereon.

In another aspect, provided is a user equipment. The user equipment includes a radio frequency (RF) unit configured to receive and transmit a RF signal and a processor coupled to the RF unit. The processor is configured for: determining a number of transport blocks (TBs) to transmit using a physical uplink shared channel (PUSCH) supporting multiple-layers transmission, determining corresponding UCI to be included in each transport block based on the determined number of transport blocks and controlling the RF unit to transmit each transport block including the corresponding UCI to a base station.

The user equipment may select an appropriate transmission method based on the number of transport blocks or codewords it intends to transmit. When one transport block is to be transmitted, uplink control information included in the transport block is mapped to a plurality of layers in the same manner, thereby effecting repeated transmission. If two transport blocks are to be transmitted, uplink control information may be included in all of the two transport blocks or included only in one of the two transport blocks based on the type and importance of the uplink control information, thereby increase transmission reliability and the efficiency of resource usage.

DESCRIPTION OF EXEMPLARY EMBODIMENTS

The following technology can be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier-Frequency Division Multiple Access (SC-FDMA). CDMA can be implemented using radio technology, such as Universal Terrestrial Radio Access (UTRA) or CDMA2000. TDMA can be implemented by radio technology, such as Global System for Mobile communications (GSM)/General Packet Radio Service (GPRS)/Enhanced Data Rates for GSM Evolution (EDGE). OFDMA can be implemented by radio technology, such as IEEE 802.11 (Wi-Fi), IEEE 802.16 (WiMAX), IEEE 802.20, or Evolved UTRA (E-UTRA). IEEE 802.16m is the evolution of IEEE 802.16e, and it provides backward compatibility with a system based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using Evolved-UMTS Terrestrial Radio Access (E-UTRA). 3GPP LTE adopts OFDMA in downlink and adopts SC-FDMA in uplink. LTE-Advanced (A) is the evolution of 3GPP LTE. In order to clarify a description, a situation in which the present invention is applied to an LTE-A system is assumed, but the technical spirit of the present invention is not limited thereto.

Figure 1:
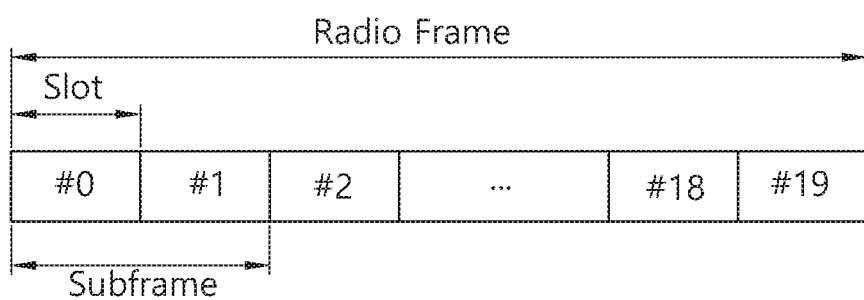
FIG. 1 shows the structure of a radio frame in 3GPP LTE/LTE-A.

FIG. 1 shows the structure of a radio frame in 3GPP LTE/LTE-A.

Referring to FIG. 1, the radio frame includes 10 subframes, and each of the subframes includes 2 slots. The slots within the radio frame are given slot numbers from #0 to #19. The time that is taken for one subframe to be transmitted is called a Transmission Time Interval (TTI). The TTI can be called a scheduling unit for data transmission. For example, the length of one radio frame can be 10 ms, the length of one subframe can be 1 ms, and the length of one slot can be 0.5 ms. The structure of the radio frame is only an example. Accordingly, the number of subframes included in the radio frame or the number of slots included in the subframe can be changed in various ways.

Figure 2:
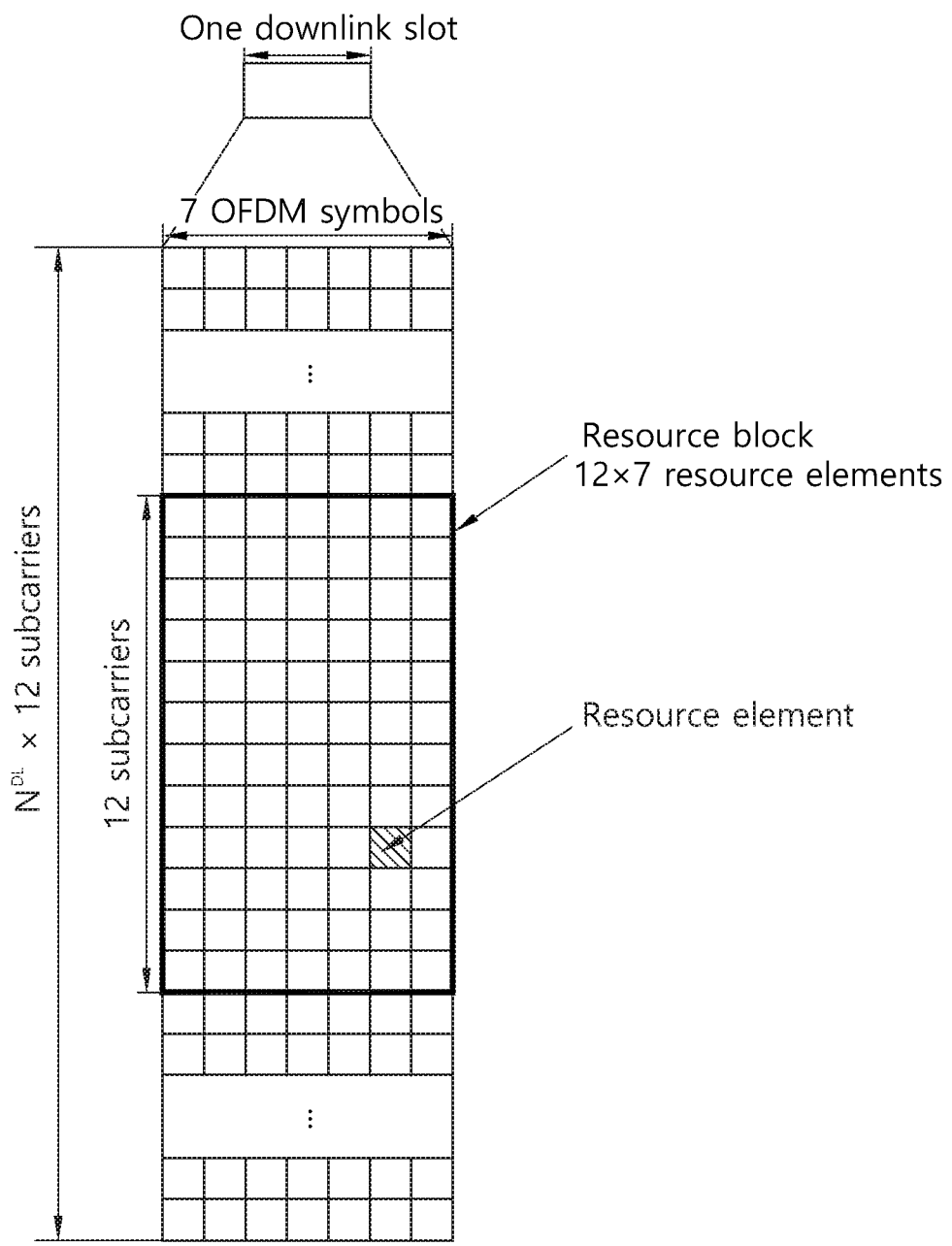
FIG. 2 shows an example of a resource grid for one slot.

FIG. 2 shows an example of a resource grid for one slot.

The slot includes a downlink slot and an uplink slot. The downlink slot includes a plurality of Orthogonal Frequency Division Multiplexing (OFDM) symbols in a time domain. The OFDM symbol indicates a specific time interval, and the OFDM symbol may also be called an SC-FDMA symbol depending on a transmission method. The downlink slot includes an NRB number of Resource Blocks (RBs) in a frequency domain. The RB is a resource allocation unit, and the RB includes one slot in the time domain and a plurality of contiguous subcarriers in the frequency domain.

The number of RBs $N_{RB}$ included in the downlink slot depends on a downlink transmission bandwidth configured in a cell. For example, in an LTE system, the number $N_{RB}$ can be any one of 6 to 110. An uplink slot can have the same structure as the downlink slot.

Each element on the resource grid is called a Resource Element (RE). An RE on the resource grid can be identified by an index pair (k,l) within a slot. Here, k (k=0, $N_{RB} \times 12-1$) is a subcarrier index within the frequency domain, and l(l=0, . . . , 6) is an OFDM symbol index within the time domain.

One RB is illustrated as including 7×12 REs, including 7 OFDM symbols in the time domain and 12 subcarriers in the frequency domain, but the number of OFDM symbols and the number of subcarriers within one RB are not limited thereto. The number of OFDM symbols and the number of subcarriers can be changed in various ways depending on the length of a CP, frequency spacing, etc. For example, in the case of a normal Cyclic Prefix (CP), the number of OFDM symbols is 7 and in the case of an extended CP, the number of OFDM symbols is 6. In one OFDM symbol, one of 128, 256, 512, 1024, 1536, and 2048 can be selected and used as the number of subcarriers.

Figure 3:
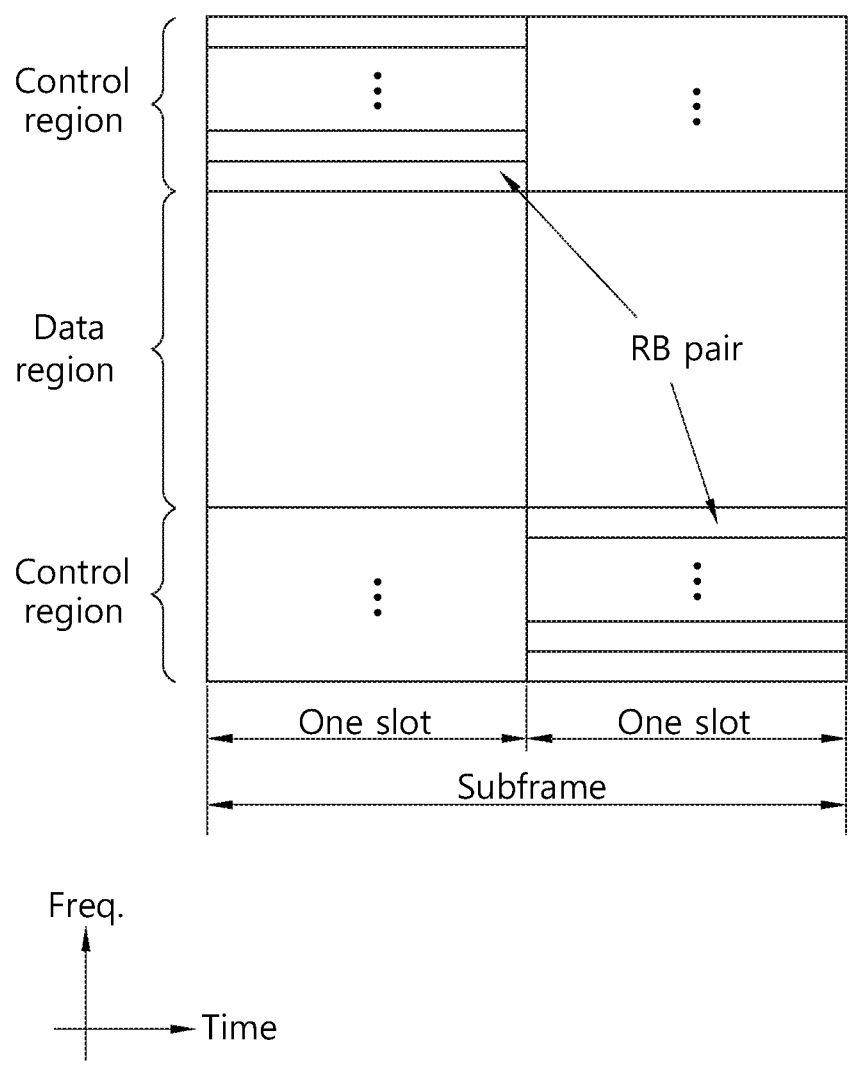
FIG. 3 shows the structure of an uplink subframe.

FIG. 3 shows the structure of an uplink subframe.

The uplink subframe can be divided into a control region and a data region in a frequency domain. Physical uplink control channels (PUCCHs) on which uplink control information is transmitted are allocated to the control region. Physical uplink shared channels (PUSCHs) through which data is transmitted are allocated to the data region. A terminal (user equipment: UE) may send or may not send a PUCCH and a PUSCH at the same time depending on a configuration.

A PUCCH for one terminal is allocated as an RB pair in a subframe. RBs belonging to the RB pair occupy different subcarriers in a first slot and a second slot. A frequency occupied by RBs that belong to an RB pair allocated to a PUCCH is changed on the basis of a slot boundary. This is called that the RB pair allocated to the PUCCH has been frequency-hopped in the slot boundary. A terminal can obtain a frequency diversity gain by sending uplink control information through different subcarriers over time.

The uplink control information transmitted on the PUCCH includes ACK/NACK (also referred to as HARQ-ACK), CSI (Channel State Information) indicating a downlink channel state, and SR (Scheduling Request) as an uplink radio resource allocation request. The CSI includes a precoding matrix index or a precoding matrix indicator (PMI) indicating a precoding matrix, a rank indicator (RI) indicating a rank value preferred by the user equipment, and a channel quality indicator (CQI) indicating a channel state. PM and RI may refer to CSIs reported by the user equipment to support multi-input multi-output (MIMO) operation.

PUSCH is mapped to UL-SCH (Uplink Shared Channel) which is a transmission channel. The uplink data transmitted on the PUSCH may be a transport block (TB) which is a data block for the UL-SCH transmitted during the TTI. The transport block may be user information. Alternatively, the uplink data and uplink control information (UCI) may be multiplexed and transmitted. That is, the transport block for the UL-SCH and the UCI may be multiplexed. The UCI may be at least one of a for example, a CQI, a PMI, an RI, and an ACK/NACK. Alternatively, only UCI may be transmitted on the PUSCH.

Figure 4:
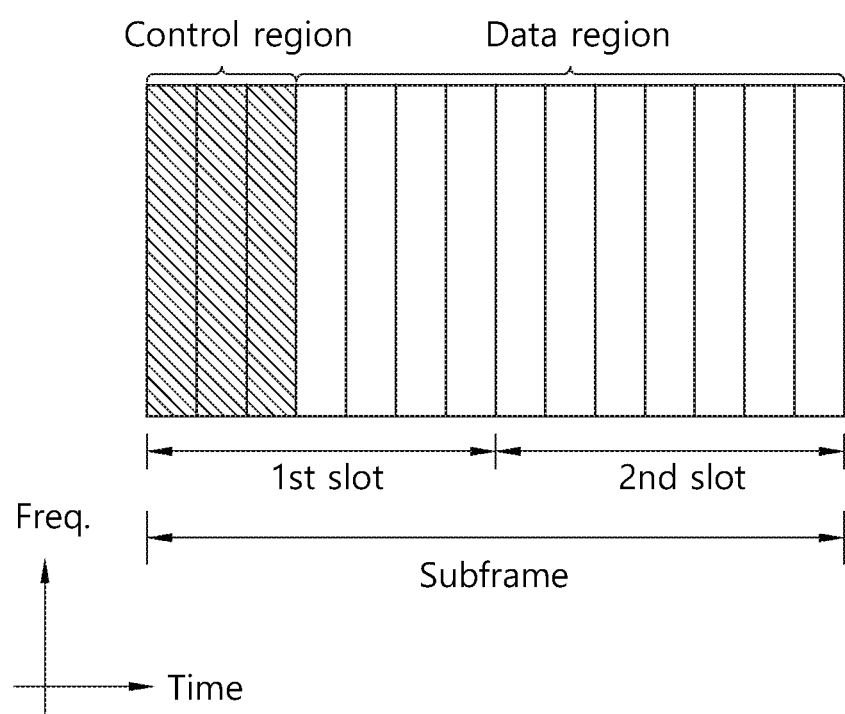
FIG. 4 shows the structure of a downlink subframe.

FIG. 4 illustrates a structure of a downlink (DL) subframe.

A DL subframe includes two slots in a time domain and each slot includes seven OFDM symbols in a normal CP (or six OFDM symbols in an extended CP). A maximum of first three OFDM symbols of a first slot of the subframe (a maximum of 4 OFDM symbols regarding a 1.4 MHz bandwidth) are a control region to which control channels are allocated, and the other OFDM symbols are a data region to which a physical downlink shared channel (PDSCH) is allocated. The PDSCH refers to a change in which a base station (BS) or a node transmits data to a user equipment (UE).

The control channel transmitted in the control region includes a physical control format indicator channel (PCFICH), a physical hybrid-ARQ indicator channel (PHICH), and a physical downlink control channel (PDCCH).

The PCFICH transmitted in the first OFDM symbol of the subframe carries a control format indicator (CFI), information regarding the number of OFDM symbols (i.e., a size of the control region) used for transmission of control channels within the subframe. After the UE first receives a CFI on the PCFICH, the UE monitors a PDCCH. The PCFICH is transmitted through a fixed PCFICH resource of the subframe.

The PHICH carries a ACK(acknowledgement)/NACK (not-acknowledgement) signal for an uplink hybrid automatic repeat request (HARQ). The ACK/NACK signal regarding uplink data transmitted from the UE is transmitted on the PHICH.

The PDCCH is a control channel transmitting downlink control information (DCI). The DCI may include resource allocation of a PDSCH (which may also be referred to as "downlink (DL) grant", resource allocation of a physical uplink shared channel (PUSCH) (which may also be referred to as "uplink (UL) grant"), an aggregation of a transmission power control command regarding individual UEs of a certain UE group and/or activation of a VoIP (Voice over Internet Protocol).

Figure 5:
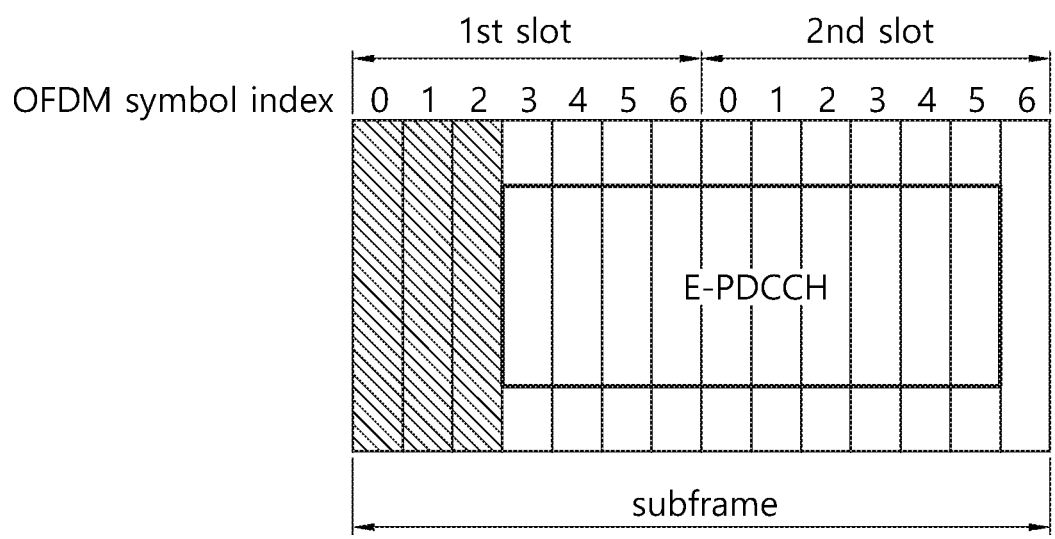
FIG. 5 illustrates an EPDCCH.

FIG. 5 illustrates an EPDCCH.

Referring to FIG. 5, an EPDCCH may be positioned to follow an existing control region in a time domain. For example, when the existing control region is transmitted in first three OFDM symbols of a subframe, the EPDCCH may be positioned in OFDM symbols positioned to follow the three OFDM symbols. In a frequency domain, the existing control region and the PEDCCH may be configured to correspond to each other or to be different. For example, the PDCCH is transmitted in the entire system band, whereas the PEDCCH may be transmitted only in the same frequency band as that of the PDSCH transmitted for a specific UE. In FIG. 5, an example in which the PEDCCH is transmitted only in some frequency band of the existing control region is illustrated. In the EPDCCH, control information for an advanced UE may be transmitted. In the EPDCCH, a reference signal for demodulation of the PDSCH may be transmitted.

<Carrier Aggregation (CA)>

Hereinafter, CA will be described.

Figure 6:
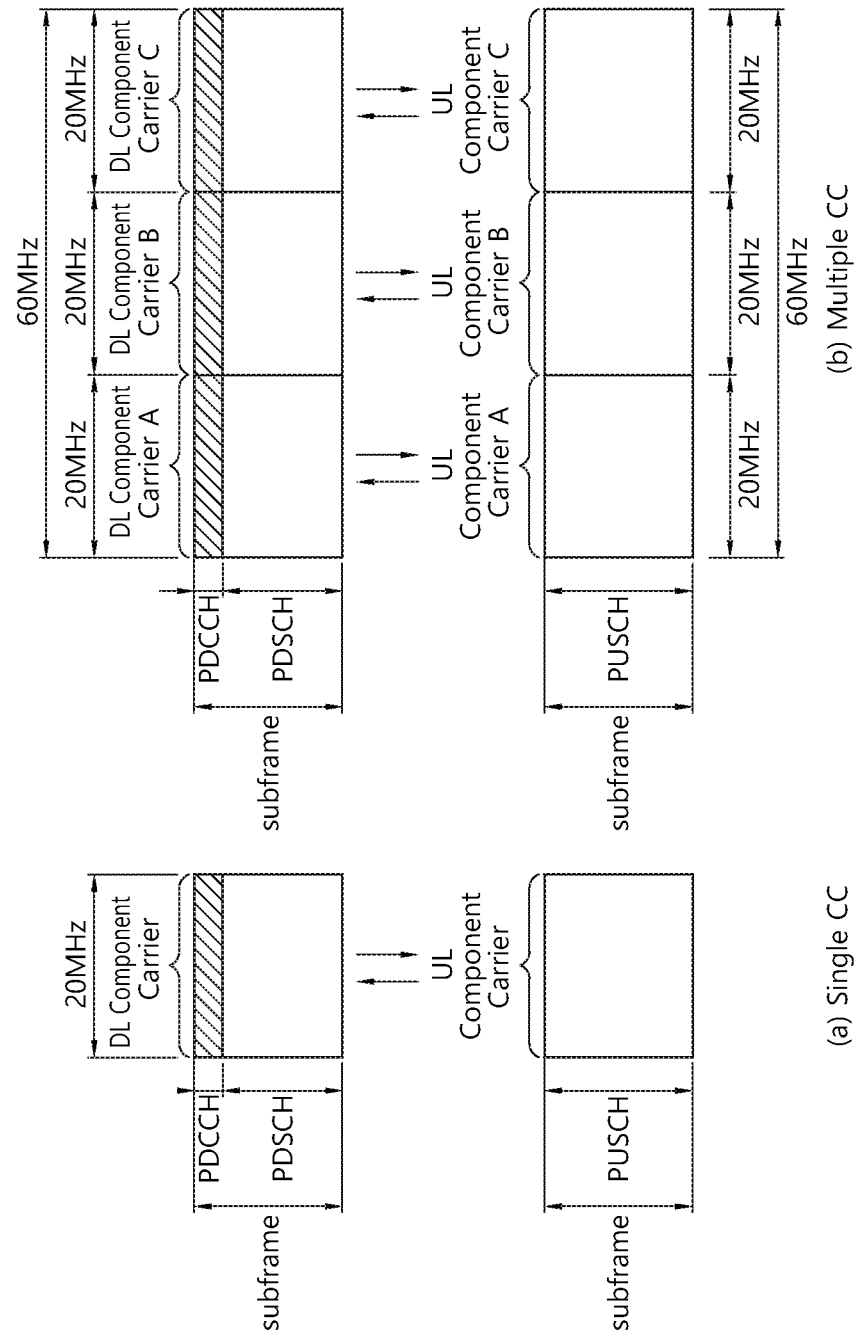
FIG. 6 is a comparison example of an existing single carrier system and a CA system.

FIG. 6 is a comparison example of an existing single carrier system and a CA system.

Referring to FIG. 6, in a single carrier system, only a single carrier is supported for UE in uplink and downlink. The bandwidth of a carrier may be various, but the number of carriers assigned to UE is one. In contrast, in a Carrier Aggregation (CA) system, a plurality of CCs DL CCs A to C and UL CCs A to C may be assigned to UE. A Component Carrier (CC) means a carrier used in a CA system, and it may be abbreviated as a carrier. For example, in order to allocate a bandwidth of 60 MHz to UE, 3 CCs each having 20 MHz may be assigned to the UE.

A CA system may be divided into a contiguous CA system in which aggregated carriers are contiguous to each other and a non-contiguous CA system in which aggregated carriers are separated from each other. When it is simply called a CA system hereinafter, it should be understood that the CA system includes a case where CCs are contiguous and a case where CCS are not contiguous.

A CC, that is, a target when one or more CCs are aggregated, may use bandwidths used in an existing system for backward compatibility with the existing system. For example, a 3GPP LTE system supports bandwidths of 1.4 MHz, 3 MHz, 5 MHz, 10 MHz, 15 MHz, and 20 MHz. A 3GPP LTE-A system may configure a broadband of 20 MHz or higher using only the bandwidths of the 3GPP LTE system. Alternatively, a 3GPP LTE-A system may configure a broadband by defining new bandwidths without using the bandwidths of an existing system.

The system frequency band of a wireless communication system is divided into a plurality of carrier frequencies. In this case, the carrier frequency means the center frequency of a cell. Hereinafter, a cell may mean downlink frequency resources and uplink frequency resources. Alternatively, a cell may mean a combination of downlink frequency resources and optional uplink frequency resources. Furthermore, in general, if a CA is not taken into consideration, a single cell may always include uplink and downlink frequency resources that form a pair.

In order for packet data to be transmitted and received through a specific cell, UE first has to complete a configuration for the specific cell. In this case, the configuration means a state in which the reception of system information necessary to transmit and receive data to and from the specific cell has been completed. For example, the configuration may include an overall process of receiving common physical layer parameters necessary for the transmission/reception of data, Medium Access Control (MAC) layer parameters, or parameters necessary for a specific operation in the RRC layer. A configuration-completed cell is in a state in which the cell may immediately transmit and receive packet data only it has only to receive information about which the packet data may be transmitted.

A cell in the configuration-completed state may be in the activation or deactivation state. In this case, the activation refers to a state in which data is being transmitted or received or a state in which data is ready to be transmitted or received. UE may monitor and receive the control channel (PDCCH) and data channel (PDSCH) of an activated cell in order to check resources (they may be the frequency, the time, etc.) assigned thereto.

Deactivation refers to a state in which traffic data cannot be transmitted or received, but measurement or the transmission/reception of minimum information are possible. UE may receive necessary System Information (SI) in order to receive packets from a deactivated cell. In contrast, the UE does not monitor or receive the control channel (PDCCH) and data channel (PDSCH) of a deactivated cell in order to check resources (they may be a frequency, time, etc.) assigned thereto.

Cells may be classified into a primary cell, a secondary cell, and a serving cell.

The primary cell means a cell that operates in a primary frequency, a cell in which UE performs an initial connection establishment procedure or a connection re-establishment procedure with a BS, or a cell that is indicated as a primary cell in a handover process.

The secondary cell means a cell that operates in a secondary frequency. The secondary cell is configured once RRC establishment is set up and used to provide additional radio resources.

The serving cell is formed of a primary cell in the case of UE in which a Carrier Aggregation (CA) has not been configured or to which a CA cannot be provided. If a CA has been configured for UE, the term 'serving cell' indicates a cell configured for UE and may be plural in this case. One serving cell may include a single DL CC or a pair of {DL CC, UL CC}. A plurality of serving cells may include a primary cell and one of all secondary cells or a set of a plurality of secondary cells.

A Primary Component Carrier (PCC) means a Component Carrier (CC) corresponding to a primary cell. A PCC is a CC through which UE forms connection or RRC connection with a BS at the early stage from among some CCs. A PCC is a special CC that is responsible for connection or RRC connection for signaling regarding a plurality of CCs and that manages UE context, that is, connection information related to UE. Furthermore, a PCC is always in the activation state when it is in RRC connected mode after forming connection or RRC connection with UE. A DL CC corresponding to a primary cell is called a DL Primary Component Carrier (DL PCC), and an UL CC corresponding to a primary cell is called an UL Primary Component Carrier (UL PCC).

A Secondary Component Carrier (SCC) means a CC corresponding to a secondary cell. That is, an SCC is a CC assigned to UE in addition to a PCC and is a carrier extended for additional resource assignment, etc. by UE in addition to a PCC. An SCC may be divided into the activation or deactivation state. A DL CC corresponding to a secondary cell is called a DL Secondary Component Carrier (DL SCC). An UL CC corresponding to a secondary cell is called an UL Secondary Component Carrier (UL SCC).

A primary cell and a secondary cell have the following characteristics.

First, a primary cell is used to transmit a PUCCH. Second, a primary cell is always activated, whereas a secondary cell is a carrier that is activated or deactivated according to specific conditions. Third, when a primary cell experiences a Radio Link Failure (hereinafter referred to as an RLF), RRC re-establishment is triggered. Fourth, a primary cell may be changed by a change of a security key or by a handover procedure that is accompanied by a random access channel (RACH) procedure. Fifth, Non-Access Stratum (NAS) information is received through a primary cell. Sixth, in the case of an FDD system, a primary cell is always formed of a pair of a DL PCC and an UL PCC. Seventh, a different CC may be configured as a primary cell in each UE. Eighth, a primary cell may be replaced through only a handover process or a cell selection/cell reselection process.

In adding a new secondary cell, RRC signaling may be used to transmit system information about a dedicated secondary cell.

In relation to a CC that forms a serving cell, a DL CC may form a single serving cell, or a DL CC and an UL CC may form a single serving cell through connection establishment. However, a serving cell is not formed of only a single UL CC.

The activation/deactivation of a CC has the same concept as the activation/deactivation of a serving cell. For example, assuming that a serving cell1 is formed of a DL CC1, the activation of the serving cell1 means the activation of the DL CC1. Assuming that a serving cell2 is configured through connection establishment of a DL CC2 and an UL CC2, the activation of the serving cell2 means the activation of the DL CC2 and the UL CC2. In this sense, each CC may correspond to a cell.

The number of CCs that are aggregated between downlink and uplink may be differently set. A case where the number of aggregated DL CCs is the same as the number of aggregated UL CCs is called a symmetric aggregation, and a case where the number of aggregated DL CCs is different from the number of aggregated UL CCs is called an asymmetric aggregation. Furthermore, the CCs may have different sizes (i.e., bandwidths). For example, assuming that 5 CCs are used to form a 70 MHz band, the 70 MHz band may be configured like 5 MHz CC (carrier #0) +20 MHz CC (carrier #1) +20 MHz CC (carrier #2) +20 MHz CC (carrier #3) +5 MHz CC (carrier #4).

As described above, unlike a single carrier system, a CA system can support a plurality of CCs, that is, a plurality of serving cells.

Such a CA system can support non-cross-carrier scheduling and cross-carrier scheduling.

Figure 7:
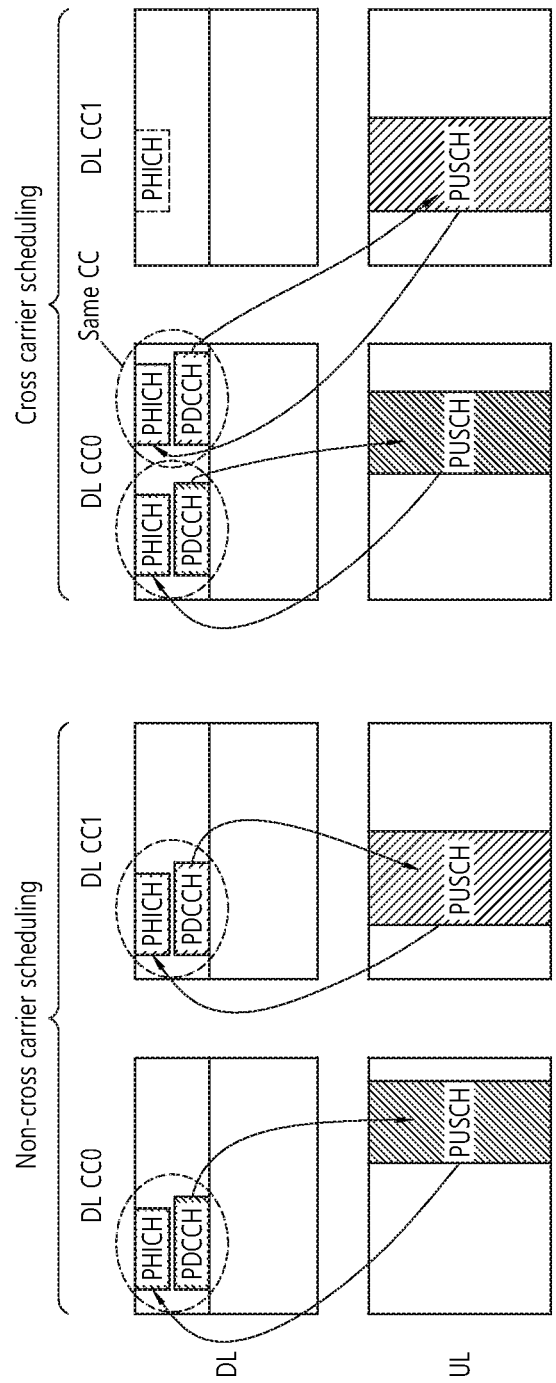
FIG. 7 illustrates non-cross-carrier scheduling and cross-carrier scheduling.

FIG. 7 illustrates non-cross-carrier scheduling and cross-carrier scheduling.

Non-cross-carrier scheduling may be said to be a method of simply extending and applying a conventional scheduling method in a single cell to a plurality of cells. If there is a PDSCH scheduled by a PDCCH, the PDCCH/PDSCH is transmitted through the same CC, and the PDCCH may schedule a PUSCH transmitted through a CC basically linked to a specific CC.

Cross-carrier scheduling is a scheduling method capable of performing the resource assignment of PDSCHs transmitted through different CCs and/or the resource assignment of PUSCHs transmitted through CCs other than CCs basically linked to a specific CC, through a PDCCH transmitted through the specific CC. That is, a PDCCH and a PDSCH may be transmitted through different DL CCs, and a PUSCH may be transmitted through another UL CC other than an UL CC that is linked to a DL CC on which a PDCCH including an UL grant has been transmitted. As described above, in a system supporting cross-carrier scheduling, a carrier indicator informing that a PDSCH/PUSCH providing control information are transmitted through what DL CC/UL CC is necessary for a PDCCH. A field including such a carrier indicator is hereinafter called a Carrier Indication Field (CIF).

A CA system supporting cross-carrier scheduling may include a CIF in a conventional Downlink Control Information (DCI) format. In a system supporting cross-carrier scheduling, for example, in an LTE-A system, 3 bits may be extended because a CIF is added to an existing DCI format (i.e., a DCI format used in LTE). In the structure of a PDCCH, an existing coding method and resource assignment method (i.e., resource mapping based on a CCE) may be reused.

Now, the present invention is described.

First, the PUSCH processing procedure will be described.

Figure 8:
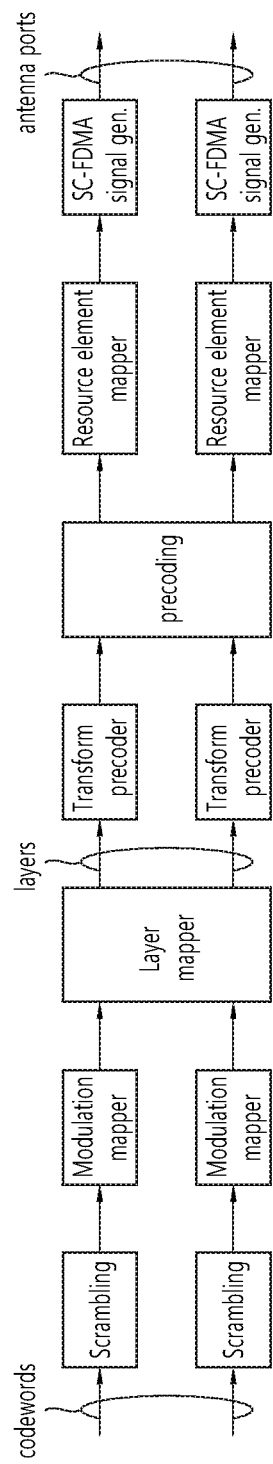
FIG. 8 shows a PUSCH processing procedure.

FIG. 8 shows a PUSCH processing procedure.

Referring to FIG. 8, the codeword is scrambled and then modulated into a modulation symbol having a complex value by a modulation mapper. In this connection, codeword may be interpreted as equivalent to transport block (TB). For example, a transport block may refer to a predetermined number of bits including information to be transmitted, while the codeword may be the result of coding the bits making up the transport block in an error-robust manner. More specifically, cyclic redundancy check (CRC) bits may be added to the bits constituting the transport block, which in turn may be divided into the code blocks which in turn may be encoded.

The bits constituting the codeword are modulated by a modulation mapper using either QPSK (Quadrature Phase Shift Keying), 16 QAM (16 Quadrature Amplitude Modulation) or 64 QAM, thereby generating modulated symbols. The modulated symbols for each codeword are mapped to one or two layers by the layer mapper. The layer refers to the different streams generated by spatial multiplexing. The layer may be described by which symbol is mapped to which transmission antenna port. The rank of a transmission means the number of layers to be transmitted. For a rank greater than one, two codewords may be transmitted.

The following table illustrates how the codeword maps to the layer.

TABLE 1

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M_{symb}^{layer} = M_{symb}^{(0)}/2 = M_{symb}^{(1)}/2$ |

In the above table, $d^{(q)}(0), \ldots, d^{(q)}(M^{(q)}_{symb}-1)$ denotes modulated symbols having a complex value for codeword q. $d^{(q)}(0), \ldots, d^{(q)}(M^{(q)}_{symb}-1)$ is mapped to $x(i) = [x^{(0)}(i) \ldots x^{(v-1)}(i)]^T$. $M^{layer}_{symb}$ represents the number of modulated symbol for each layer. That is, the mapping between the transport block and the layer may be defined as follows: 1) one transport block (CW) is mapped to one layer, 2) one transport block (CW) is mapped to two layers, 3) two transport blocks (CW) are mapped to two layers, 4) two transport blocks (CW) are mapped to three layers, 5) two transport blocks (CW) are mapped to four layers.

The symbol having the complex value mapped to each layer is transform-precoded by a transform percoder. The precoded symbol is then mapped to a respective resource element (RE) by a resource element mapper. The mapped symbols become an SC-FDMA signal by an SC-FDMA signal generator. The generated SC-FDMA signal is transmitted via an antenna port.

According to the present invention, when a large number of cells (for example, six or more cells) are configured for a user equipment by a carrier aggregation technique (CA), a method for efficiently transmitting UCI information using multiple layers of PUSCH is proposed.

Hereinafter, for convenience of explanation, a license-based cell is referred to as LCELL, and a cell based on a non-licensed band (LTE-U) may also be referred to as UCELL.

Further, the resource period acquired/configured in an aperiodic manner in the corresponding UCELL is designated as a reserved resource period (RRP).

A control information channel associated with the PDSCH transmitted on the downlink subframe of the RRP period, i.e., the subframe designated for the downlink, or a control information channel associated with the PUSCH transmitted on the uplink subframe of the RRP period, i.e., the subframe designated for the uplink may be configured to be transmitted from a predefined LCELL. That is, cross carrier scheduling (CCS) may be used. Alternatively, the control information channels may be transmitted from the same UCELL. That is, self-scheduling (SFS) may be used.

The downlink control information channel associated with PDSCH reception in the RRP period may be configured such that one downlink control information channel schedules one PDSCH received at the same (or specific) time point (subframe). This is called single subframe scheduling (SSFS). Alternatively, the downlink control information channel associated with PDSCH reception in the RRP period may be configured such that one downlink control information channel schedules one PDSCH received at the same (or specific) time point (subframe) and a predefined or signaled number of PDSCHs received at different time points. This is called multi subframe scheduling (MSFS).

The RRP period on the UCELL may be a resource configured in an aperiodic or discrete manner depending on the carrrier sensing (CS) results. As an example, the RRP period on UCELL may be defined by at least one of followings: 1) a period during which a user equipment performs a (time/frequency) synchronization operation on UCELL or during which it may be assumed that a synchronization signal (for example, PSS, SSS) is transmitted from the base station to the user equipment, 2) a period during which the user equipment performs a CSI measurement operation on the UCELL or during which it may be assumed that a reference signal (e.g. CRS, CSI-RS) for this measurement is transmitted from the base station thereto, 3) a period during which the user equipment performs DCI detection operation related to data transmission/reception in the UCELL, 4) a period during which the user equipment performs (transitory or temporary) buffering operation of the signal received from the UCELL.

Hereinafter, for convenience of explanation, the proposed scheme will be described based on the 3GPP LTE/LTE-A system. However, the scope of the system to which the proposed scheme is applied is not limited to the 3GPP LTE/LTE-A system and may be extended to other systems.

[Proposed method #1] The rule may be defined such that when some or all of the following conditions are satisfied, uplink control information (UCI) is transmitted using a PUSCH based on a plurality of layers without data transmission. In this connection, the UCI may include at least one of a for example, a CQI/PMI/RI, and a HARQ-ACK.

For convenience of description, the UCI transmission operation or transmission mode in which the UCI is transmitted using a PUSCH based on a plurality of layers is referred to as "ML_UCIWODATA" without data transmission. In this connection, the term 'transport block: TB' may be (re-)interpreted as 'codeword: CW', as used herein.

Figure 9:
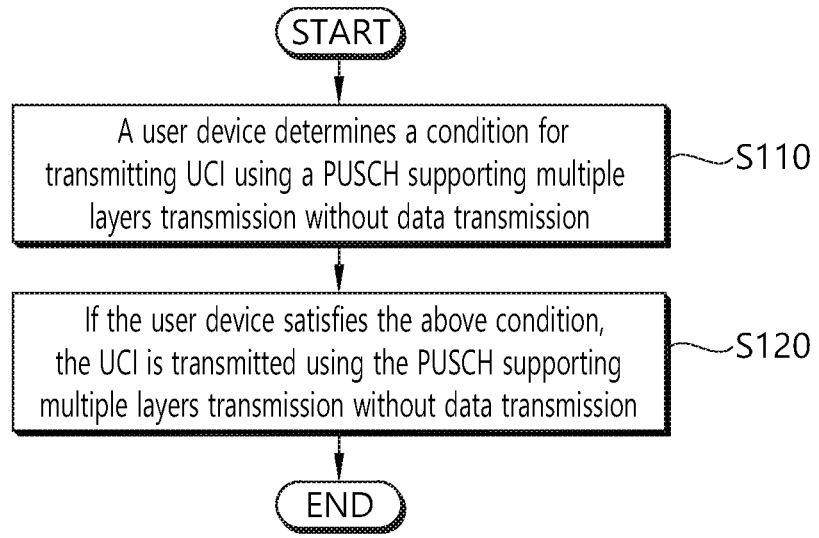
FIG. 9 shows operation of a user equipment according to [proposed method #1].

FIG. 9 shows operation of a user equipment according to [proposed method #1].

Referring to FIG. 9, a user equipment determines a condition for transmitting UCI using a PUSCH supporting multiple layers transmission without data transmission (S110).

If the user equipment satisfies the above condition, the UCI is transmitted using the PUSCH supporting multiple layers transmission without data transmission (S120). That is, conventionally, when transmitting UCI by using PUSCH without data transmission, a single layer transmission is performed. Alternatively, when transmitting UCI with PUSCH with data transmission, the convention method transmitted the UCI with data in each data transmission layer. However, according to the present invention, if the specific conditions are satisfied, UCI may be transmitted using the PUSCH that supports multiple layers transmission without data transmission.

For example, if at least one of the following conditions is satisfied, the user equipment may transmit the UCI using a PUSCH that supports multiple layers transmission without data transmission.

(Condition #1-1) When receiving DCI format defined in advance.

The DCI format may be for example, DCI format 4. The DCI format 4 is a DCI format used for scheduling PUSCH based on multiple antenna port transmission mode. DCI format 4 may provide a field indicating a modulation and coding technique and redundancy version for each transport block (this field may be referred to as modulation and coding scheme and redundancy version field, or simply MCS field, which informs $I_{MCS}$). Further, a field indicating precoding information and the number of layers (also referred to as precoding information and number of layers field) may be provided by the DIC format 4.

(Condition #1-2) When a pre-defined or signaled number of transport blocks (TB) is 'ENABLED'. This may be the case when, for example, 1 or 2 TBs are available.

The user equipment may determine the modulation order (denoted as $Q'_m$) of the PUSCH based on the value of the MCS field ($I_{MCS}$).

The following table shows examples of the modulation order ($Q'_m$) based on the value of the MCS field ($I_{MCS}$), the index indicating the transport block size ($I_{TBS}$), and the redundancy version ($rv_{idx}$).

TABLE 2

| MCS Index $I_{MCS}$ | Modulation Order $Q'_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |

TABLE 2-continued

| MCS Index $I_{MCS}$ | Modulation Order $Q'_m$ | TBS Index $I_{TBS}$ | Redundancy Version $rv_{idx}$ |
|---|---|---|---|
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

If the MCS field information and/or RA (RESOURCE BLOCK ASSIGNMENT) field information related to the specific TB on the DCI format (for example, DCI format 4) received by the user equipment does not satisfy all or some of the following conditions, the user equipment may consider the specific TB as 'ENABLED'.

1) (Condition #1-2-1) When the MCS field ($I_{MCS}$) indicates a value of '0' and the number of physical resource blocks (PRB) allocated using the RA field indicates a value larger than '1'.

2) (Condition #1-2-2) When the MCS field ($I_{MCS}$) indicates a value of '28' and the number of allocated PRBs using the RA (RESOURCE ALLOCATION) field indicates a value of '1'.

(Condition #1-3) When the MCS field ($I_{MCS}$) associated with each TB indicates a pre-defined or signaled value. This is for example the case when the value of the MCS field associated with each TB may be designated as RESERVED 29, 30, or 31 on Table 2 above.

(Condition #1-4) 'Number of transmission layers (NUM_TXLAYER)' is a pre-defined or signaled number (for example, 2) or more.

For example, this may be the case when the value of the PRECODING INFORMATION AND NUMBER OF LAYERS field on the received DCI format indicate a pre-defined or signaled NUM_TXLAYER or more. The field may be 3 bits or 6 bits.

Alternatively, this may be the case when the PRECODING INFORMATION and NUMBER OF LAYERS fields in the received DCI format indicate RESERVED STATE.

'TPMI (TRANSMITTED PRECODING PRECODING MATRIX INDICATOR)' information and/or 'NUM_TXLAYER' information indicated by 'RESERVED STATE' may be informed by the base station to the UE via pre-defined signaling (for example, upper layer signaling such as RRC message or physical layer signaling). Alternatively, 'TPMI (TRANSMITTED PRECODING PRECODING MATRIX INDICATOR)' information and/or 'NUM_TXLAYER' information indicated by 'RESERVED STATE' may be fixed values.

(Condition #1-5) When the CSI REQUEST BIT field on the received DCI format triggers an A-CSI report related to a pre-defined or signaled number or more cells and/or CSI process, and/or when the number of PRBs allocated using the RA field is less (or greater) than or equal to the pre-defined or signaled number (for example, 20, 4).

(Condition #1-6) When 'NUMBER OF ANTENNA PORTS: NUM_ANTPT' or the number of physical antennas is greater than or equal to the pre-defined or signaled threshold, or is a pre-defined or signaled value. The corresponding threshold may be specified as for example, '2'.

(Condition #1-7) When MUTI-ANTENNA PORT TRANSMISSION MODE, that is, the uplink MIMO mode is configured for the UE, or alternatively, when the user equipment has capabilities associated with the uplink MIMO mode operation.

(Condition #1-8) When more cells than the pre-defined or signaled threshold value are configured for the UE via a carrier aggregation (CA) (or in a large CA mode (MASSIVE CA MODE).

The threshold value may be configured as '5' (or '8'). Alternatively, or additionally, cells configured in a pre-defined or signaled specific TDD UL-DL configuration (e.g. TDD UL-DL configuration #5) may be excluded.

(Condition #1-9) When size/amount of UCI bits to be transmitted, or size/amount of HARQ-ACK bits, and/or size/amount of CSI (for example, RI/CQI/PMI), or the number of CSI reports to be transmitted, or the number of CSI processes associated with the CSI report is greater than the pre-defined or signaled threshold value.

In one example, the just above condition may be interpreted as a case where the coding rate associated with the UCI information transmission (or HARQ-ACK information transmission and/or CSI information transmission) is greater than the pre-defined or signaled threshold value. The 'coding rate' may dynamically vary depending on 'scheduled bandwidth or resource size' related to UCI information transmission (or HARQ-ACK information transmission and/or CSI information transmission) or the size/amount of HARQ-ACK bits or the size/amount of UCI bits to be transmitted, and/or the size of CSI (for example, RI/CQI/PMI)) (or the number of CSI reports to be transmitted or (number of CSI processes related to CSI reports).

(Condition #1-10) When the specific field on the pre-defined DCI format indicates a pre-defined or signaled specific value.

The specific field may be a for example, an NDI field (e.g., 1 bit) or a UL INDEX (/DL INDEX) field (e.g., 2 bits). In this regard, the field may be interpreted as follows: If the 'NDI field' indicates a value of '1', multiple layer-based UCI transmissions are triggered, while if the 'NDI field' indicates a value of '0', a single layer (and/or 1 TB)-based UCI transmission is triggered.

Alternatively, the specific field may be an additional defined multiple layer-based UCI transmission triggering field (e.g., 1 bit).

In one example, when 'multiple layers-based UCI transmission (mode)' is applied to/linked to/associated with some (or all) states indicated by 'CSI request bit field (e.g. 2 bit, 1 bit), and, further, if the received 'CSI request bit field' indicates the corresponding state, a rule may be defined such that 'multiple layers-based UCI transmission' may be carried out.

[Proposed Method #2]

Figure 10:
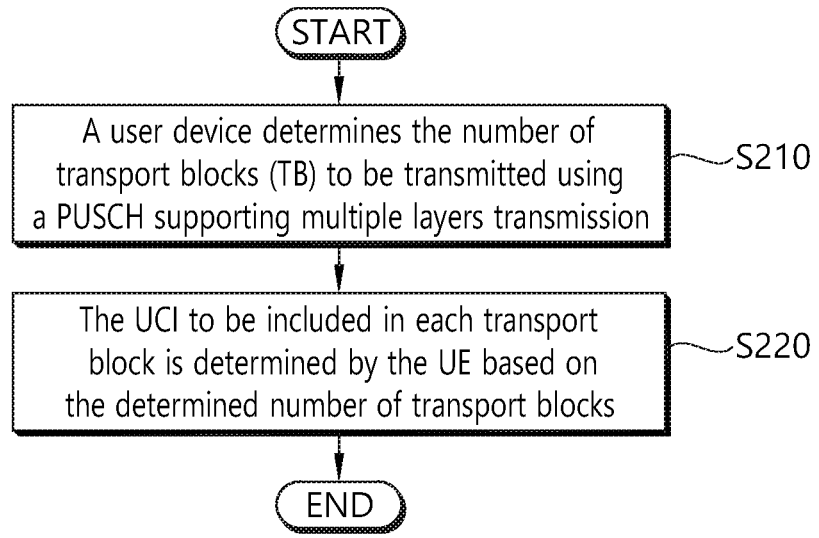
FIG. 10 shows a user equipment operation according to the proposed method #2 described above.

FIG. 10 shows a user equipment operation according to the proposed method #2 described above.

Referring to FIG. 10, a user equipment determines the number of transport blocks (TB) to be transmitted using a PUSCH supporting multiple layers transmission (S210). The UCI to be included in each transport block is determined by the UE based on the determined number of transport blocks (S220).

For example, UCI transmission operation, in which UCI is transmitted using a plurality of layers-based PUSCH without data transmission, that is, [proposed method #1]-based ML_UCIWODATA operation may be applied to the following cases.

(Case #2-1) When the [Condition #1-2] of [proposed method #1] is defined as 'case when more than or equal to one TB (S) is ENABLED' or 'case when one TB is ENABLED' and when only one TB is actually ENABLED and the 'preceding information and number of layers' field indicates '2' or more number of layers.

(Case #2-2) When the [Condition #1-2] of [proposed method #1] is defined as 'case when more than or equal to one TB (S) is ENABLED' or 'case when two TBs are ENABLED' and when the two TBs are actually ENABLED and the 'preceding information and number of layers' field indicates '2' or more number of layers.

In the above (Case #2-1) or (Case #2-2), ML_UCIWODATA-based UCI information transmission may be configured to perform according to some or all of the following rules: In this connection, for reference, according to the current standard, 'TB(/CW)-TO-LAYER MAPPING' relationship may be defined to be '1 TB(/CW)-> 1 LAYER', '1 TB(/CW)-> 2 LAYER', '2 TB(/CW)-> 2 LAYER', '2 TB(/CW)-> 3 LAYER', '2 TB(/CW)-> 4 LAYER'.

(Rule #2-1) In the above case (case #2-1), that is, when only 1 TB is actually enabled, 1 TB is transmitted via '2 layers', A UCI transmission may be performed as follows:

(Example #2-1-1) UCI information (or HARQ-ACK information and/or CSI (RI/CQI/PMI) information) mapped/transmitted using '2 layers' may be the same. In this transmission method, a spatial diversity effect can be obtained.

RI information and/or HARQ-ACK information (and/or CQI information and/or PMI information) mapped/transmitted on a specific layer may be defined to be repeatedly mapped/transmitted on another layer.

Figure 11:
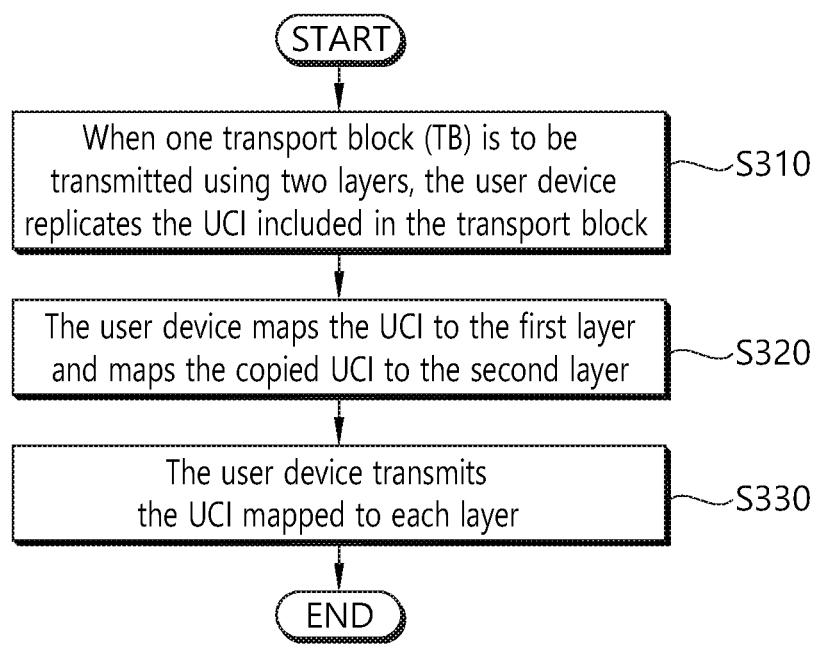
FIG. 11 shows a user equipment operation according to the above-described example #2-1-1.

FIG. 11 shows a user equipment operation according to the above-described example #2-1-1.

When one transport block (TB) is to be transmitted using two layers, the user equipment replicates the UCI included in the transport block (S310). The user equipment maps the UCI to the first layer and maps the copied UCI to the second layer (S320). The user equipment transmits the UCI mapped to each layer (S330). For example, when the user equipment transmits UCI (at least one of ACK/NACK information and CSI information) using a PUSCH supporting two layers, UCI transmitted in the first layer and UCI transmitted in the second layer may be the same. That is, the UE may repeatedly transmit the same UCI in each layer.

(Example #2-1-2) UCI information (or HARQ-ACK information and/or CSI (RI/CQI/PMI) information) mapped/transmitted via each layer may partially or entirely differ.

A cell type (e.g. LCELL, UCELL) and/or cell group (CELL GROUP:CG) index and/or cell index (and/or CSI process index (/ID) and/or CSI subframe set index) that are related to UCI information (or HARQ-ACK information and/or CSI(RI/CQI/PMI) information) mapped/transmitted via each layer may be configured using predefined signaling (or rules).

Mapping/transmission rules of UCI information (or HARQ-ACK information and/or CSI (RI/CQI/PMI) information) using each layer may be defined as follows without direct (or additional) signaling:

For example, (the predefined or signaled number) of CSI report related information having a relatively high (or low) priority may be configured to be mapped to or transmitted via a layer having a lower index (or higher index) in ascending order (or descending order).

Priority may be defined as follows: 1. cell group index-> CSI reporting type-> CSI process index(/ID)-> cell index-> CSI subframe set index. Alternatively, 2. CSI reporting type-> cell group index-> CSI process index(/ID)-> cell index -> CSI subframe set index. Alternatively, 3. CSI reporting type-> CSI process index(/ID)-> cell group index -> cell index -> CSI subframe set index (or CSI reporting type-> CSI process index(/ID)-> cell index -> cell group index -> CSI subframe set index or CSI reporting type-> CSI process index(/ID)-> cell index -> CSI subframe set index-> cell group index). This may indicate a candidate position where a parameter related to the cell group index may be inserted.

CSI reports related to relatively low (or high) cell group index and/or cell index and/or CSI subframe set index and/or CSI process index (/ID) may be configured to have a relatively high priority. Additionally or alternatively, the CSI report associated with the LCELL (or UCELL) may be configured to have a higher priority than the CSI report associated with the UCELL (or LCELL). Additionally or alternatively, a CSI report associated with a PUCCH transmission cell may be configured with a higher priority than a CSI report associated with a cell that does not transmit a PUCCH.

Exceptionally, the RI information and/or HARQ-ACK information mapped/transmitted on a specific layer may be (repeatedly) mapped/transmitted on another layer. On the other hand, the CQI information and/or PMI information mapping/transmission may follow "cell type (e.g. LCELL, UCELL) and/or cell group index and/or cell index (and/or CSI process index (/ID) and/or CSI subframe set index) mapped/transmitted on each layer" as configured via the pre-defined signaling (or rule).

(Rule #2-2) In the above case (case #2-2), that is, when 2 TBs are actually enabled, and when the specific TB is transmitted using '1 layer' or more than or equal to 2 layers, UCI transmissions may be performed depending on some or all of the following methods.

(Example #2-2-1) A rule may be configured such that HARQ-ACK information and/or RI information are mapped/transmitted on two TBs, while CQI information and/or PMI information are only mapped/transmitted on the TB of the highest MCS ($I_{MCS}$).

The choice of TB with the highest MCS ($I_{MCS}$) is valid if the DCI format tells a TB-specific MCS value. In one example, additional MCS values may be applied/linked to 'RESERVED MCS INDEX' (e.g. 29, 30, 31) via predefined signaling (or rule).

UCI information (or HARQ-ACK information and/or CSI (RI/CQI/PMI) information) mapping/transmission rule related to the specific TB may be configured to follow the above (Rule #2-1).

Figure 12:
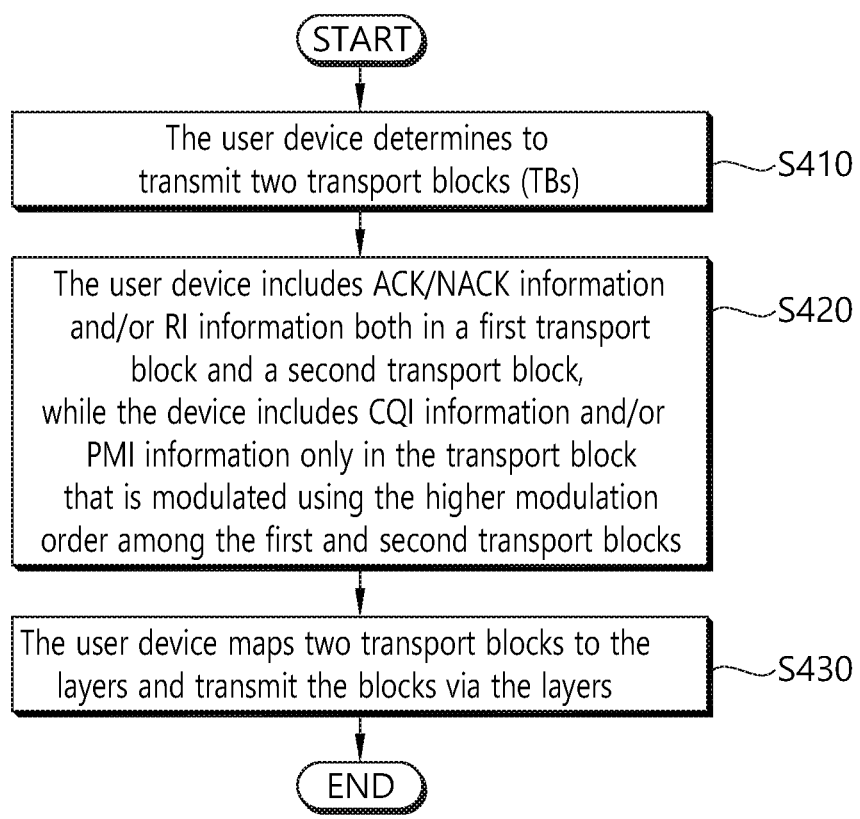
FIG. 12 shows a user equipment operation according to the example #2-2-1.

FIG. 12 shows a user equipment operation according to the example #2-2-1.

Referring to FIG. 12, when the user equipment determines to transmit two transport blocks (TBs) (S410), the user equipment includes ACK/NACK information and/or RI information both in a first transport block and a second transport block, while the device includes CQI information and/or PMI information only in the transport block that is modulated using the higher modulation order among the first and second transport blocks (S420). That is, the device includes the UCI with a relatively high importance, such as ACK/NACK and RI in both transport blocks, thereby effecting the repetitive transmission. Further, UCI, which has relatively low importance such as CQI/PMI, may be included only in the transport block with higher modulation order, thereby increase resource utilization. The user equipment maps two transport blocks to the layers and transmit the blocks via the layers (S430).

(Example #2-2-2) A cell type (e.g. LCELL, UCELL) and/or cell group index and/or cell index (and/or CSI process index (/ID) and/or CSI subframe set index) as associated with UCI information (or HARQ-ACK information and/or CSI (RI/CQI/PMI) information) mapped to and transmitted via each TB(layer) may be configured using predefined signaling (or rules).

In one example, mapping/transmission rules of UCI information (or HARQ-ACK information and/or CSI (RI/CQI/PMI) information) related to a specific TB (/layer) may be configured to follow the (Rule #2-1).

In another example, (exceptionally) HARQ-ACK information and/or RI information are mapped to and transmitted using two TBs. On the other hand, the CQI information and/or PMI information mapping/transmission may be configured to follow "cell type (e.g. LCELL, UCELL) and/or cell group index and/or cell index (and/or CSI process index (/ID) and/or CSI subframe set index) mapped/transmitted on each layer" as configured via the pre-defined signaling (or rule).

[Example #2-2-3] Information associated with CSI reports that have a pre-signaled (or defined) number and have a relatively high (or low) priority (for example, the priority described in (Example #2-1-2)) may be mapped/transmitted on TB having the highest MCS ($I_{MCS}$). Information associated with CSI reports with a relatively low (or high) priority (and with a pre-signaled (or defined) number) may be mapped/transmitted on the remaining TBs.

UCI information (or HARQ-ACK information and/or CSI (RI/CQI/PMI) information) mapping/transmission rules related to a specific TB (/layer) may be configured to follow the (Rule #2-1).

In one example, (exceptionally), HARQ-ACK information and/or RI information is mapped/transmitted on two TBs. On the other hand, CQI information and/or PMI information with a relatively high (or low) priority (having a pre-signaled (or defined) number) is mapped/transmitted on a TB having the highest MCS (IMCS). CQI information and/or PMI information with a relatively low (or high) priority (having a pre-signaled (or defined) number) may be mapped/transmitted on the remaining TBs.

Figure 13:
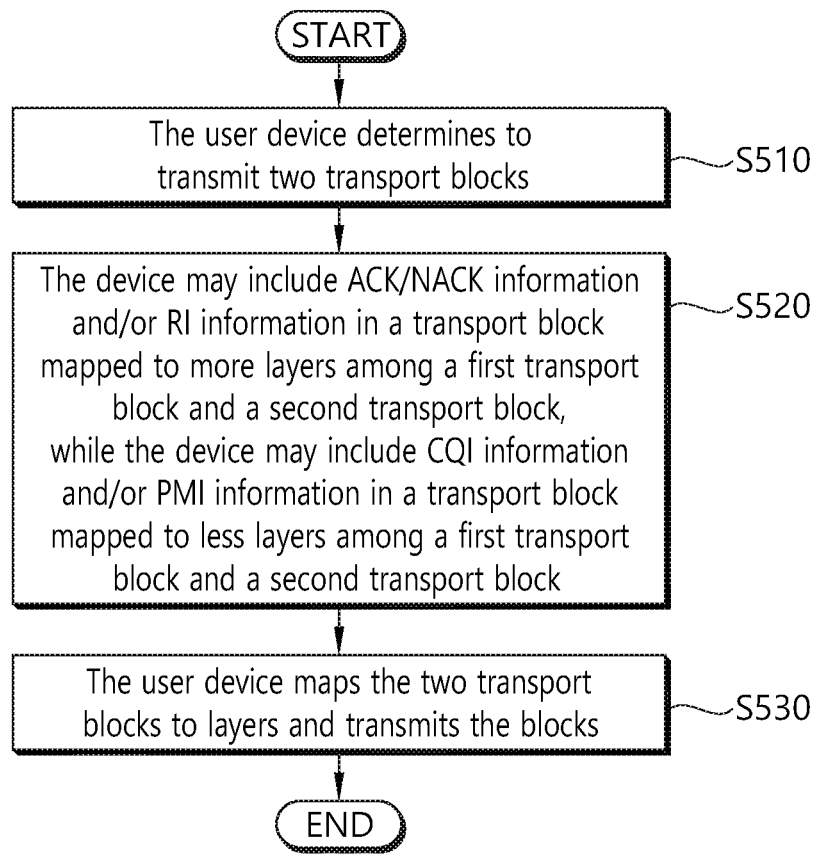
FIG. 13 shows another example of the UCI transmission method by the user equipment.

FIG. 13 shows another example of the UCI transmission method by the user equipment.

Referring to FIG. 13, when the user equipment determines to transmit two transport blocks (S510), the device may include ACK/NACK information and/or RI information in a transport block mapped to more layers among a first transport block and a second transport block, while the device may include CQI information and/or PMI information in a transport block mapped to less layers among a first transport block and a second transport block (S520). The user equipment maps the two transport blocks to layers and transmits the blocks (S530). For example, if the modulation order associated with ML_UCIWODATA is fixed to a specific value (for example, QPSK), UCI information (HARQ-ACK information and CSI (RI/CQI/PMI) information with relatively high priority) having a pre-signaled (or defined) number and a relatively high priority may be mapped/transmitted on the TB mapped to a relatively large number of layers. UCI information (HARQ-ACK information and CSI (RI/CQI/PMI) information with relatively low priority) having a pre-signaled (or defined) number and a relatively low priority may be mapped/transmitted on the remaining TB, that is, the TB mapped to a relatively smaller number of layers.

In another example, if the modulation order associated with ML_UCIWODATA is fixed to a specific value (e.g. QPSK), UCI information (HARQ-ACK information and CSI (RI/CQI/PMI) information) having a pre-signaled (or defined) larger number may be mapped/transmitted on the TB mapped to a relatively large number of layers.

(Example #2-2-4) If the modulation order associated with ML_UCIWODATA is fixed to a specific value (e.g. QPSK), UCI information (HARQ-ACK information and CSI (RI/CQI/PMI) information) having a pre-signaled (or defined) larger number (amount) may be mapped/transmitted on the TB with the highest MCS ($I_{MCS}$).

(Rule #2-3), in the above (Case #2-2), that is, when two TBs are actually ENABLED, separate channel coding may be applied to each of some or all UCI information(s) (or PMI/CQI information and/or RI information(s) and/or HARQ-ACK information(s)) transmitted using different TBs. The channel coding may be defined such that for example, tail biting convolutional code (TBCC) and/or 'CRC generation/ATTACH' are used as the channel coding.

In one specific example in which the above (Rule #2-3) is applied, when 7 cells are configured for the UE using carrier aggregation, and if the CQI/PMI information(s) (1STTB_CP) associated with the three cells are transmitted using the first TB, and if the CQI/PMI information (2NDTB_CP) associated with the remaining 4 cells are transmitted using the second TB, the separate channel coding (and/or CRC generation/ATTACH) may be applied separately to each of 1STTB_CP and 2NDTB_CP.

It will be apparent to those skilled in the art that the examples of the proposed scheme described above may be included as one of the implementation methods of the present invention, and thus may be considered as a kind of proposed schemes. Further, the above-described proposed schemes may be implemented independently or in combination (or merging) of some proposed schemes. Further, the above-described proposed schemes may be further applied even when transmitting UCI with data using the PUSCH (in the case of TX OF UCI W/DATA) taking into account specific conditions (for example, PUSCH resource amount, number of CSI feedbacks, influence of data code rate due to rate matching, etc.).

Figure 14:
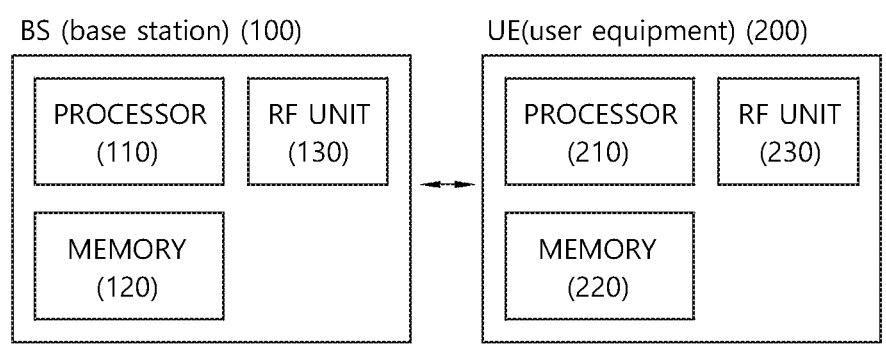
FIG. 14 is a block diagram illustrating a base station and a user equipment.

FIG. 14 is a block diagram illustrating a base station and a user equipment.

The base station 100 includes a processor 110, a memory 120, and an RF unit (radio frequency unit) 130. Processor 110 implements the proposed functionality, process and/or method. The memory 120 is connected to the processor 110 and stores various information for driving the processor 110. The RF unit 130 is connected to the processor 110 to transmit and/or receive a wireless signal.

The user equipment 200 includes a processor 210, a memory 220, and an RF unit (radio frequency unit) 230. Processor 210 implements the proposed functionality, process and/or method. The memory 220 is connected to the processor 210 and stores various information for driving the processor 210. The RF unit 230 is connected to the processor 210 to transmit and/or receive a wireless signal.

The processors 110 and 210 includes may include an ASIC (Application-Specific Integrated Circuit), a chip set, a logical circuit, and/or a data processing device. The memories 120 and 220 may include a ROM (Read-Only Memory), a RAM (Random Access Memory), a flash memory, a memory card, a storage medium, and/or any other storage device. The RF units 130 and 230 may include a baseband circuit for processing a radio signal. When the embodiment is implemented by software, the foregoing techniques may be implemented as modules (processes, functions, and the like) performing the foregoing functions. The modules may be stored in the memories 120 and 220 and executed by the processors 110 and 210. The memories 120 and 220 may be provided within or outside the processors 110 and 120 and may be connected to the processors 110 and 210 through a well-known unit.

What is claimed is:

1. A method for transmitting uplink control information (UCI) by a user equipment (UE) in a wireless communication system, the method comprising:
    determining a number of transport blocks (TBs) to transmit using a physical uplink shared channel (PUSCH) supporting multiple-layers transmission;
    determining corresponding UCI to be included in each transport block based on the determined number of transport blocks; and
    transmitting each transport block including the corresponding UCI to a base station,
    wherein when the number of TBs is determined as two, at least one of acknowledgement/not-acknowledgement (ACK/NACK) information or a rank indicator (RI) is included in a first transport block of two transport blocks, and at least one of a channel quality indicator (CQI) or a precoding matrix index (PMI) is included in a second transport block of the two transport blocks,
    wherein the first transport block is mapped to more layers than the second transport block and a Modulation Coding Scheme (MCS) of the first transport block is higher than an MCS of the second transport block,
    wherein only the UCI is transmitted on the PUSCH without data transmission thereon,
    wherein the method further comprises receiving a downlink control information (DCI) format from the base station by the user equipment, and
    wherein only when the DCI format is a specific DCI format or a number of cells configured for the user equipment is greater than a threshold value, only the UCI is transmitted on the PUSCH without data transmission thereon.

2. The method of claim 1, further comprising:
    when one transport block is to be transmitted using two layers of the PUSCH, duplicating UCI to be transmitted to form duplicated UCI;
    mapping the UCI to be transmitted to a first layer of the two layers;
    mapping the duplicated UCI to a second layer of the two layer; and
    transmitting the mapped UCIs using the layers.

3. A user equipment (UE) comprising:
    a radio frequency (RF) unit configured to receive and transmit a RF signal; and
    a processor coupled to the RF unit, wherein the processor is configured for:
    determining a number of transport blocks (TBs) to transmit using a physical uplink shared channel (PUSCH) supporting multiple-layers transmission;
    determining corresponding UCI to be included in each transport block based on the determined number of transport blocks; and
    controlling the RF unit to transmit each transport block including the corresponding UCI to a base station,
    wherein when the number of TBs is determined as two, at least one of acknowledgement/not-acknowledgement (ACK/NACK) information or a rank indicator (RI) is included in a first transport block of two transport blocks, and at least one of a channel quality indicator (CQI) or a precoding matrix index (PMI) is included in a second transport block of the two transport blocks, wherein the first transport block is mapped to more layers than the second transport block and a Modulation Coding Scheme (MCS) of the first transport block is higher than an MCS of the second transport block, wherein only the UCI is transmitted on the PUSCH without data transmission thereon, wherein the processor is further configured for receiving a downlink control information (DCI) format from the base station, and wherein only when the DCI format is a specific DCI format or a number of cells configured for the user equipment is greater than a threshold value, only the UCI is transmitted on the PUSCH without data transmission thereon.

4. The UE of claim 3, wherein the processor is further configured for:

when one transport block is to be transmitted using two layers of the PUSCH, duplicating UCI to be transmitted to form duplicated UCI;

mapping the UCI to be transmitted to a first layer of the two layers;

mapping the duplicated UCI to a second layer of the two layer; and controlling the RF unit to transmit the mapped UCIs using the layers.

* * * * *